US010240927B2

(12) United States Patent
Wirola et al.

(10) Patent No.: US 10,240,927 B2
(45) Date of Patent: Mar. 26, 2019

(54) SUPPORTING MAGNETIC FLUX DENSITY BASED POSITIONING

(71) Applicant: HERE GLOBAL B.V., Eindhoven (NL)

(72) Inventors: Lauri Wirola, Tampere (FI); Jari Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 35 days.

(21) Appl. No.: 15/517,113

(22) PCT Filed: Oct. 8, 2014

(86) PCT No.: PCT/EP2014/071491
§ 371 (c)(1),
(2) Date: Apr. 5, 2017

(87) PCT Pub. No.: WO2016/055100
PCT Pub. Date: Apr. 14, 2016

(65) Prior Publication Data
US 2017/0241785 A1    Aug. 24, 2017

(51) Int. Cl.
*G01C 21/08* (2006.01)
*G01C 21/04* (2006.01)
(Continued)

(52) U.S. Cl.
CPC .............. *G01C 21/08* (2013.01); *G01C 21/04* (2013.01); *G01C 21/206* (2013.01); *G06F 17/141* (2013.01); *G06F 17/147* (2013.01)

(58) Field of Classification Search
CPC ........ G01C 21/00; G01C 21/04; G01C 21/08; G01C 21/206; G06F 17/00; G06F 17/141; G06F 17/147
See application file for complete search history.

(56) References Cited

U.S. PATENT DOCUMENTS 5,152,011 A * 9/1992 Schwob ................. H03J 1/0075
                                                                          348/731
5,152,012 A * 9/1992 Schwob ................. H03J 1/0075
                                                                          348/E5.096
(Continued)

FOREIGN PATENT DOCUMENTS

CN      102340868          2/2012
CN      103175529 A        6/2013
(Continued)

OTHER PUBLICATIONS

"Finland-based Startup Uses Magnetic Fields for Indoor Mapping" [retrieved Oct. 6, 2014]. Retrieved from the Internet: <URL: http://www.new-startups.com/apps/finland-based-startup-uses-magnetic-fields-for-indoor-mapping/> (dated Jul. 16, 2012) 4 pages.
(Continued)

*Primary Examiner* — Yonel Beaulieu
(74) *Attorney, Agent, or Firm* — Alston & Bird LLP

(57) ABSTRACT

An apparatus obtains data comprising magnetic flux density data and an association of the magnetic flux density data to grid points of at least one grid, each grid point representing at least a geographical location. The apparatus applies at least one frequency transform to a representation of the magnetic flux density data and their association to grid points to obtain frequency components. The apparatus provides compressed magnetic flux density data comprising a subset of the obtained frequency components for at least one of storage and transmission. The same apparatus or another apparatus applies at least one inverse frequency transform to the frequency components in order to recover the magnetic flux density data and their association with different grid points and provides the recovered magnetic flux density data and their association with different grid points for supporting a positioning of a mobile device.

18 Claims, 7 Drawing Sheets

(51) Int. Cl.
*G06F 17/00* (2006.01)
*G01C 21/20* (2006.01)
*G06F 17/14* (2006.01)

(56) References Cited

U.S. PATENT DOCUMENTS

| | | | | |
|---|---|---|---|---|
| 5,393,713 | A * | 2/1995 | Schwob | H03J 1/0058 348/732 |
| 5,732,338 | A * | 3/1998 | Schwob | H03J 1/0058 348/E5.096 |
| 7,009,533 | B1 | 3/2006 | Wegener | |
| 2001/0040525 | A1 | 11/2001 | Springer et al. | |
| 2007/0002780 | A1 | 1/2007 | Pessi | |
| 2007/0281634 | A1 | 12/2007 | Rao et al. | |
| 2008/0077326 | A1 | 3/2008 | Funk et al. | |
| 2008/0120315 | A1 | 5/2008 | Ionescu et al. | |
| 2010/0030905 | A1 | 2/2010 | Fikouras et al. | |
| 2010/0309051 | A1 | 12/2010 | Moshfeghi | |
| 2012/0203453 | A1 | 8/2012 | Lundquist et al. | |
| 2012/0264447 | A1 | 10/2012 | Rieger, III | |
| 2013/0053067 | A1 | 2/2013 | Aggarwal et al. | |
| 2013/0179075 | A1 | 7/2013 | Haverinen | |
| 2013/0196684 | A1 | 8/2013 | Dong et al. | |
| 2014/0081592 | A1 | 3/2014 | Bellusci et al. | |
| 2014/0082320 | A1 | 3/2014 | Christoffersson et al. | |
| 2016/0161592 | A1 | 6/2016 | Wirola et al. | |
| 2017/0343695 | A1 * | 11/2017 | Stetson | G01V 3/14 |

FOREIGN PATENT DOCUMENTS

| | | |
|---|---|---|
| EP | 2 252 124 A1 | 11/2010 |
| EP | 2 530 843 A2 | 12/2012 |
| KR | 20090062737 | 6/2009 |
| WO | WO-2013/034585 A1 | 3/2013 |
| WO | WO-2013/065042 A1 | 5/2013 |
| WO | WO-2013/136123 A1 | 9/2013 |
| WO | WO-2013/136124 A1 | 9/2013 |
| WO | WO-2013/136129 A1 | 9/2013 |

OTHER PUBLICATIONS

Aboshosha et al. "Analysis of Geomagnetic Signatures of Indoor Terrains using Discrete Cosine Transform (DCT), A Tutorial." [retrieved Mar. 16, 2017]. Retrieved from the Internet: <URL: http://www.mathworks.com/matlabcentral/fx_files/3643/1/content/DCT_GM.htm>. (dated Jun. 2003) 4 pages.

Bruno, Michelle. "Indoor Navigation for Events Using the Earth's Magnetic Field." [Retrieved Oct. 6, 2014.] Retrieved from the Internet: <URL: http://www.eventtechbrief.com/page.cfm/action=libary/libID=3/libEntryID=48/listID=1> (dated Jun. 9, 2014.) 2 pages.

Marcelloni et al. "A Simple Algorithm for Data Compression in Wireless Sensor Networks." IEEE Communication Letters, vol. 12, No. 6, Jun. 2008, 3 pages.

Press et al. "Numerical Recipes in C: The Art of Scientific Computing, Second Edition." Cambridge University Press, 1992, 949 pages.

International Search Report and Written Opinion for International Patent Application No. PCT/EP2014/071491 dated Jun. 15, 2015, 8 pages.

International Preliminary Report on Patentability from International Patent Application No. PCT/EP2014/071491 dated Apr. 20, 2017, 8 pages.

Aboshosha et al. "Analysis of Geomagnetic Signatures of Indoor Terrains using Discrete Cosine Transform (DCT), A Tutorial." [retrieved Jun. 4, 2015]. Retrieved from the Internet: <URL: http://www.mathworks.com/matlabcentral/fx_files/3643/1/content/DCT_GM.htm>. (dated Jun. 2003) 5 pages.

Aboshosha et al. "Disambiguating Robot Positioning Using Laser and Geomagnetic Signatures", Proceedings of the 8th Conference on Intelligent Autonomous Systems IAS, vol. 8, (dated Jan. 1, 2004, pp. 10-13.

Office Action for European Application No. 14789537.9 dated Jul. 17, 2018, 8 pages.

* cited by examiner

SUPPORTING MAGNETIC FLUX DENSITY BASED POSITIONING

FIELD OF THE DISCLOSURE

The invention relates to the field of positioning and more specifically to positioning utilizing information about magnetic flux density.

BACKGROUND

Network-based positioning is based on measurements taken from available communications networks, such as cellular networks and wireless local access networks (WLAN). Depending on the signaling structures in the network, measurements used for the positioning can be Received Signal Strength (RSS), propagation delay, Angle Of Arrival (AOA), Round-Trip Time (RTT), or any other measurement that is applicable for positioning purposes.

Typically, the network based positioning is divided in two stages. In a training stage, learning data is collected. The data may be collected in the form of fingerprints that are based on measurements of mobile devices. A fingerprint may contain a location estimate and measurements taken from the radio interfaces. The location estimate may be for example global navigation satellite system (GNSS) based, sensor-based, WLAN-based, or manually inputted. If the measurements taken from the radio interfaces are, by way of example, RSS measurements, the measurements may comprise for instance an RSS value in dBm, where the Doppler effect (fast fading) has been averaged out, timing measurements (e.g. RTT), an identification of a base station or of a WLAN access point, a Cell ID in cellular networks and Medium Access Control (MAC) addresses, Service Set Identifiers (SSID), etc., in WLANs. The training can be a continuous background process, in which mobile devices are continuously reporting measured data to the server or learn their radio environment internally offline. In an estimation/positioning stage or data estimation stage, a mobile device may estimate its current location based on the data or a subset of data that is available from the training stage.

If the data is collected by a server, the collected measurement data may be uploaded to a database in the server or in the cloud, where algorithms may be run to generate models of radio communication nodes for positioning purposes. Such models may be coverage areas, node positions, radio propagation models, etc. In the end, these models or parts of them may be transferred to mobile devices for use in position determination. Alternatively, the models may be stored in a positioning server to which the mobile devices may connect to for obtaining position information.

One considerable difference between indoor and outdoor positioning is the importance of vertical direction. In outdoor positioning it is often enough to achieve horizontal position estimates using a two-dimensional map, whereas indoors, especially in tall buildings, it may be essential to have a capability to estimate also the user floor. This leads to a three-dimensional data processing both in the data collection stage and the positioning stage.

SUMMARY OF SOME EMBODIMENTS OF THE INVENTION

For a first aspect, an example embodiment of a method comprises, performed by at least one apparatus, obtaining data comprising magnetic flux density data and an association of the magnetic flux density data to grid points of at least one grid, each grid point representing at least a geographical location. The method further comprises applying at least one frequency transform to a representation of the magnetic flux density data and their association to grid points to obtain frequency components. The method further comprises providing compressed magnetic flux density data comprising a subset of the obtained frequency components for at least one of storage and transmission.

For a second aspect, an example embodiment of a method comprises, performed by at least one apparatus, obtaining frequency components representing magnetic flux density data and an association of the magnetic flux density data with different grid points of at least one grid in compressed form, each grid point representing at least a geographical location. The method further comprises applying at least one inverse frequency transform to the frequency components in order to recover the magnetic flux density data and their association with different grid points. The method further comprises providing the recovered magnetic flux density data and their association with different grid points for supporting a positioning of a mobile device.

For the first aspect, an example embodiment of a first apparatus comprises means for performing the actions of the example method presented for the first aspect.

For the second aspect, an example embodiment of a first apparatus comprises means for performing the actions of the example method presented for the second aspect.

The means of the first apparatus presented for the first aspect as well as the means of the first apparatus presented for the second aspect can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit.

For the first aspect, moreover an example embodiment of a second apparatus is presented, which comprises at least one processor and at least one memory including computer program code, the at least one memory and the computer program code configured to cause the processor at least to perform the actions of the example method presented for the first aspect.

For the second aspect, moreover an example embodiment of a second apparatus is presented, which comprises at least one processor and at least one memory including computer program code, the at least one memory and the computer program code configured to cause the processor at least to perform the actions of the example method presented for the second aspect.

Any of the described apparatuses may comprise only the indicated components or one or more additional components.

For the first aspect, moreover an example embodiment of a non-transitory computer readable storage medium is presented, in which computer program code is stored. The computer program code causes an apparatus to perform the actions of the example method presented for the first aspect when executed by a processor.

For the second aspect, moreover an example embodiment of a non-transitory computer readable storage medium is presented, in which computer program code is stored. The computer program code causes an apparatus to perform the actions of the example method presented for the second aspect when executed by a processor.

For both aspects, the computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the respective computer program code by itself has to be considered an embodiment of the invention. The computer program code could also be distributed to several computer readable storage mediums for each aspect.

In certain embodiments, any of the presented methods is an information providing method, and any of the presented first apparatuses is an information providing apparatus. In certain embodiments, the means of the presented first apparatus of the first aspect or the means of the presented first apparatus of the second aspect are processing means.

In certain embodiments of the methods presented for the first aspect and of the methods presented for the second aspect, the methods are methods for supporting a magnetic flux density based positioning. In certain embodiments of the apparatuses presented for the first aspect and of the apparatuses presented for the second aspect, the apparatuses are apparatuses for supporting a magnetic flux density based positioning.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
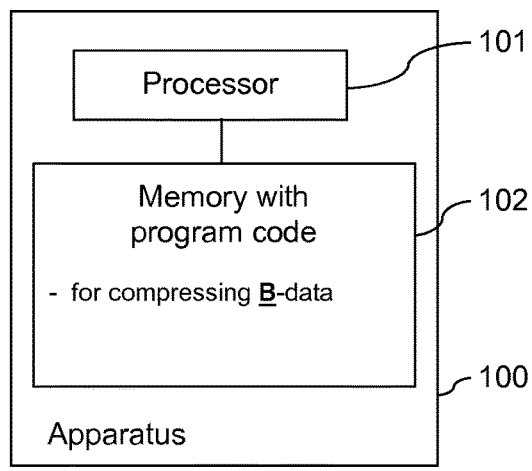
FIG. 1 is a schematic block diagram of an example embodiment of an apparatus according to the first aspect.

FIG. 1 is a schematic block diagram of an example embodiment of an apparatus 100 of the first aspect. Apparatus 100 comprises a processor 101 and, linked to processor 101, a memory 102. Memory 102 stores computer program code for compressing magnetic flux density (B) data. Processor 101 is configured to execute computer program code stored in memory 102 in order to cause an apparatus to perform desired actions.

Apparatus 100 could be a stationary device, like a dedicated location server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the second aspect. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus obtains data comprising magnetic flux density data and an association of the magnetic flux density data to grid points of at least one grid, each grid point representing at least a geographical location. (action 201) The data could be obtained from a memory of the device comprising the apparatus, or from some other device. In the latter case, it could be obtained upon request or automatically, for instanced in regular intervals. Each grid point representing at least a geographical location can be understood such that optionally, a grid point could also represent some further parameter. This also means that several grid points could represent the same geographical location.

The apparatus furthermore applies at least one frequency transform to a representation of the magnetic flux density data and their association to grid points to obtain frequency components. (action 202) Such frequency components are also referred to as transform coefficients. The representation of the magnetic flux density data and their association to grid points to which a frequency transform is applied could be the same as the representation in the obtained data. Alternatively, the representation in the obtained data could be adjusted for facilitating the application of the frequency transform. More than one frequency transform may be applied to a representation of magnetic flux density data that is obtained for different areas. More than one frequency transform may be applied to a representation of magnetic flux density data that is obtained for a single area as well, for example in case different aspects of the magnetic flux density data for a particular area are associated with grid points of different grids representing the same area.

The apparatus furthermore provides compressed magnetic flux density data comprising a subset of the obtained frequency components for at least one of storage and transmission. (action 203) The subset may comprise less frequency components than resulting from the frequency transform in action 202. It is to be understood that the frequency components may be subject to further processing before being provided for storage or transmission. The compressed data can be provided in particular as assistance data for supporting a positioning of mobile devices. In certain embodiments, the apparatus may also cause storage and/or transmission of the provided data. In certain embodiments, the apparatus may also store and/or transmit of the provided data. It is to be understood that additional data may be provided too. Such additional data may but does not have to be compressed.

Figure 3:
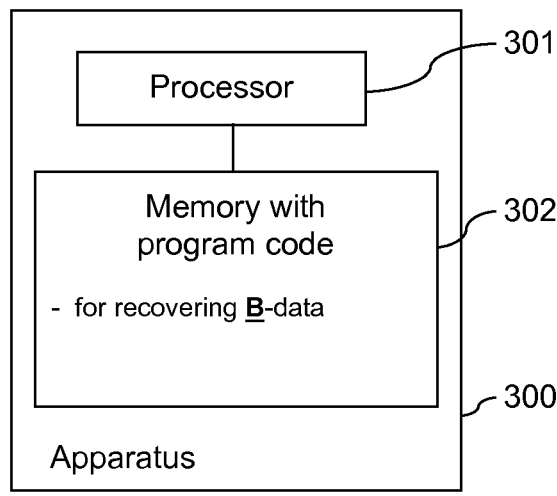
FIG. 3 is a schematic block diagram of an example embodiment of an apparatus according to the second aspect.

FIG. 3 is a schematic block diagram of an example embodiment of an apparatus 300 of the second aspect. Apparatus 300 comprises a processor 301 and, linked to processor 301, a memory 302. Memory 302 stores computer program code for recovering magnetic flux density data. Processor 301 is configured to execute computer program code stored in memory 302 in order to cause an apparatus to perform desired actions.

Apparatus 300 may be a mobile device, like a mobile communication device, or a stationary device, like a server. Apparatus 300 could equally be a module, like a chip, circuitry on a chip or a plug-in board, for a device. Optionally, apparatus 300 could comprise various other components, like a magnetometer, a data interface, a user interface, a further memory, a further processor, etc.

An operation of apparatus 300 will now be described with reference to the flow chart of FIG. 4. The operation is an example embodiment of a method according to the second aspect. Processor 301 and the program code stored in memory 302 cause an apparatus to perform the operation when the program code is retrieved from memory 302 and executed by processor 301. The apparatus that is caused to perform the operation can be apparatus 300 or some other apparatus, for example but not necessarily a device comprising apparatus 300.

The apparatus obtains frequency components representing magnetic flux density data and an association of the magnetic flux density data with different grid points of at least one grid in compressed form, each grid point representing at least a geographical location. (action 401) The frequency components may be obtained from a memory belonging to the same device as the apparatus or from another device.

The apparatus furthermore applies at least one inverse frequency transform to the frequency components in order to recover the magnetic flux density data and their association with different grid points. (action 402) That is, in certain embodiments, separate inverse frequency transform could be applied to different sets of frequency components.

The apparatus furthermore provides the recovered magnetic flux density data and their association with different grid points for supporting a positioning of a mobile device. (action 403) The apparatus could belong to the mobile device or to another device. The recovered data could be provided for a positioning of the mobile device in the mobile device or at another device.

In addition to the network-based positioning technologies, it is an option to utilize information on magnetic fields, or more precisely, the magnetic flux density, for supporting a positioning of mobile devices. Magnetic field positioning is based on the idea that the metal structures in the frame of buildings distort the Earth's magnetic field and thereby produce a location-dependent locally unique magnetic field signature. Having a database of magnetic field characteristics allows locating mobile devices in a similar fashion as in network-based positioning, that is, by comparing a respective measurement at a mobile device with values in the database.

If information on magnetic flux density is to be used in a positioning of mobile devices, magnetic flux density data may be collected and stored in a database. The magnetic flux density can be considered as a location dependent vector field. That is, for each possible pair of longitude and latitude values of a geographical location, or a triplet of longitude, latitude and altitude values, if the height is considered in addition, a vector with three elements ($b_x$, $b_y$, $b_z$) may be determined, each element indicating the amplitude of the magnetic flux density in another direction at the particular location. When considering only magnetic flux density vectors that have been mapped to grid points of a discrete grid, the amount of magnetic flux density data may be limited. Still, the amount of data that has to be stored and/or transferred to a device performing positioning computations is significant. Compared to a radio signal strength based positioning, which may be based on a database storing a single radio signal strength value for respective grid point, the amount of data that is to be stored for a magnetic field based positioning triples.

Certain embodiments of the invention therefore provide for the first aspect that available magnetic flux density data that are associated with grid points of a grid are transformed into the frequency domain. The data in the frequency domain may be compressed by selecting some of the resulting frequency components and discarding the other frequency components. The selected frequency components may then be stored for later use or be transmitted. The magnetic flux density data may be obtained in various formats. It may comprise for example magnetic flux density vectors, with each vector being associated to another grid point of a grid. Alternatively, it may comprises values of respectively three elements of magnetic flux density vectors, with the value of each element of each vector being associated to another grid point of the grid, each grid point representing a geographical location and one of three elements.

Certain embodiments of the invention provide for the second aspect that an apparatus obtains such frequency components. Magnetic flux density data as well as their association with respective grid points of a grid may be recovered by applying an inverse frequency transform to the frequency components. The recovered vectors may then be used for a positioning of a mobile device or be stored for later positioning operations.

Certain embodiments of the invention may have the effect that the required storage space for storing magnetic field data and/or a required bandwidth for transmitting magnetic field data can be reduced.

The original magnetic flux density data is likely to exhibit spatial correlations at least in parts. In particular, data associated with nearby locations may be strongly correlated. This property of the original magnetic flux density data may be exploited. By means of applying a frequency transform to the original magnetic flux density data, a decorrelated representation of the original data in the form of frequency components may be obtained. Comparatively few frequency components may be sufficient for representing the frequency transformed data such that reconstructed, i.e. inversely transformed, magnetic flux density data is still quite similar to the original data.

The wider the main slope of the autocorrelation function of the original magnetic flux density data is, the more may the original magnetic flux density data be compressed without loosing essential information. Due to the compression achieved by discarding some frequency components, less storage capacity may be required for storing the frequency transformed magnetic flux density data. Likewise transferring the frequency transformed magnetic flux density data, e.g. to a mobile device, for position estimation may consume less network bandwidth and data over air, which in turn may result in reduced costs for the user. Because of the reduced storage capacity requirements, the reduced frequency transformed magnetic flux density data may even be stored in a mobile device for which position estimations are to be performed but which has very limited storage capacities. Consequently, estimating a position of the mobile device based on the frequency transformed magnetic flux density data may even be performed offline, i.e. when the mobile device has no access to an external data storage on which the frequency transformed magnetic flux density data is stored.

Magnetic flux density vectors that are associated with different grid points may be considered as forming an image, similar to a color picture with the value of each element of a magnetic flux density vector corresponding to RGB or YCbCr values of a respective pixel and the associated grid point corresponding to the location of the pixels. Thinking of the magnetic flux density vectors and the location information as forming an image makes clear, that discrete frequency transforms, which are often applied in image compression, may also be employed for magnetic field data compression.

Figure 2:
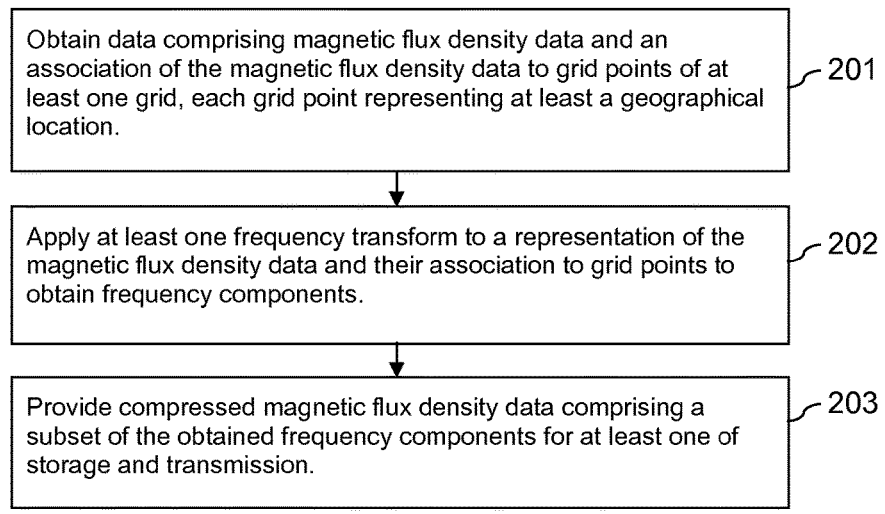
FIG. 2 is a flow chart illustrating an example embodiment of a method according to the first aspect.
Figure 4:
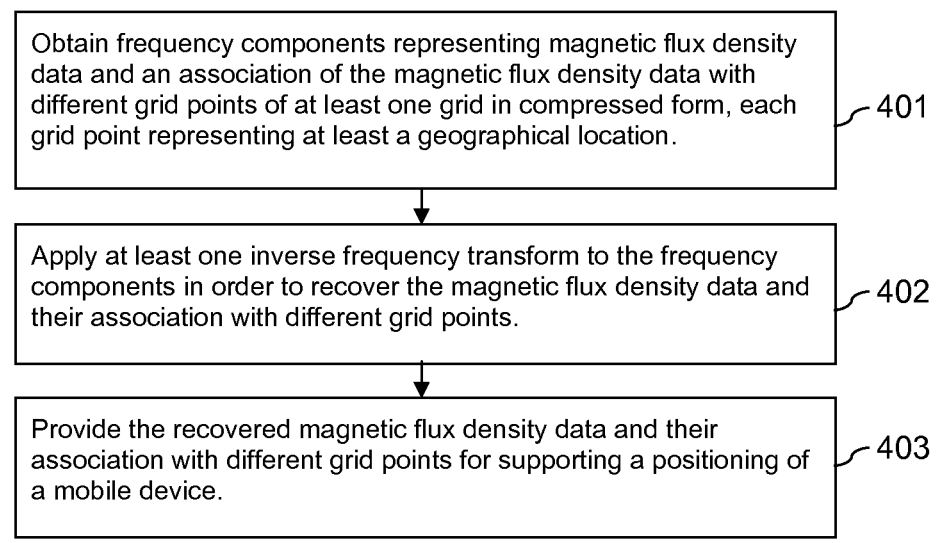
FIG. 4 is a flow chart illustrating an example embodiment of a method according to the second aspect.

Apparatus 100 illustrated in FIG. 1 and the method illustrated in FIG. 2 as well as apparatus 300 illustrated in FIG. 3 and the method illustrated in FIG. 4 may be implemented and refined in various ways.

The at least one grid could be at least one global grid, but it could also be at least one grid for a certain area. This may reduce the amount of data that is required for each positioning operation.

In an example embodiment, the magnetic flux density data comprises a representation of magnetic flux density vectors. A representation of magnetic flux density vectors means that all elements of the vectors are present in the data, but optionally in a distributed manner.

Each representation of a magnetic flux density vector may be associated with a grid point of a grid representing one of a plurality of geographical areas. This may have the effect that in case the user is assumed to be located in a particular area, knowledge about the magnetic flux density field in the area may allow a determination of the exact position of the user in the area.

Each representation of a magnetic flux density vector may be associated with a grid point of a grid representing the area of a particular building. This may have the effect that in case the user is assumed to be located in a building, knowledge about the magnetic flux density field in the building may allow a determination of the exact position of the user in the building.

The grid can be a two-dimensional grid or a three-dimensional grid. The grid points of a two-dimensional grid can be defined for example by x- and y-coordinates. The grid points of a three-dimensional grid can be defined for example by x-, y- and z-coordinates.

In an example embodiment, the grid is a two-dimensional grid, and each representation of a magnetic flux density vector is associated with coordinates of a grid point of the two-dimensional grid. Using two-dimensional grids may have the effect that the processing complexity in applying a frequency transform is limited.

A two-dimensional grid may be used, for example, in case the altitude is not of interest for the positioning of a mobile device. Furthermore, a plurality of two-dimensional grids could be used for different altitudes or for different floor numbers of buildings.

Accordingly, in an example embodiment, the grid is a two-dimensional grid, and each representation of a magnetic flux density vector is associated with coordinates of a grid point of one of a plurality of two-dimensional grids, each grid being provided for a different floor number. In a further example embodiment, the grid is a two-dimensional grid, and each representation of a magnetic flux density vector is associated with coordinates of a grid point of one of a plurality of two-dimensional grids, each grid being provided for a different altitude.

In an example embodiment, the grid is a three-dimensional grid, and each representation of a magnetic flux density vector is associated with coordinates of a grid point of the three-dimensional grid.

It is to be understood that some of these embodiments can also be used in combination. For example, a two-dimensional grid for a single altitude could be provided for each of a plurality of outdoor areas, while a three-dimensional grid could be provided for some or all indoor areas; or a plurality of two-dimensional grids for different altitude values could be provided for each of a plurality of outdoor area, while a plurality of two-dimensional grids for different floors could be provided for at least some indoor areas.

It is to be understood that the association of a vector with a grid point has to be understood to comprise as well the association of the elements of the vector with a respective one of three grid points of a grid that are associated with the same geographical location, with the grid being expanded by one dimension. Even further grid points could be considered for each location if further dimensions are introduced, including for instance an additional dimension for time.

In an example embodiment, the grid—as far as representing geographical locations—is a rectangular two-dimensional grid or a cuboid three-dimensional grid. This may have the effect that such grids may be particularly suited for applying a transform operation, at least in case magnetic flux density data is associated with each of the grid points of the grid. It is to be understood that these grids may be expanded again by one or more dimensions.

There may be some grid points of a grid, for which no magnetic flux density data is available, though. For example, if the magnetic flux density data are collected from users, the grid data is only filled up over time. Furthermore, some locations might be frequented very rarely or even be inaccessible to users. For an example embodiment of the first aspect, it is therefore provided that before applying the at least one frequency transform, grid points of the at least one grid are determined, for which no magnetic flux density data is obtained. Magnetic flux density data for determined grid points is then computed. It may be computed by interpolating or extrapolating available magnetic flux density data in order to obtain a magnetic flux density data for each grid point. This may have the effect that the resulting data may be rather realistic. Interpolation may yield better results than extrapolation, so that interpolation could be used for all grid points for which this is possible based on the available data, while extrapolation could be used for the remaining grid points. Alternatively, a default vector could be used for all or some of the determined grid points. Using default data would have the effect that only very low computational effort and little time would be required for obtaining the missing data. Due to a low-pass filtering effect of the frequency transform and the removal of frequency components, the quality of the frequency transformed data could still be acceptable when using default data.

The transform of the magnetic flux density data into the frequency domain may be realized by applying any desired type of frequency transform, in particular any desired type of discrete frequency transform. In an example embodiment, applying a frequency transform to the representation of the magnetic flux density data and an association of the magnetic flux density data to grid points to obtain frequency components comprises applying a Discrete Fourier Transform or (DFT) or a Discrete Cosine Transform (DCT), the latter for example, though not necessarily, in the form of a Fast Cosine Transform (FCT) in order to limit the number of required operations. Other types of frequency transforms could be used as well, like a Short-Time Fourier Transform (STFT), a Z-Transform or a wavelet transform.

The subset of frequency components that is selected for the compressed data may comprise for example the frequency components having the highest value.

The number of frequency components that is to be included in the subset can be set to any suitable value.

In an example embodiment, the number of frequency components in the subset is fixed. This may have the effect that no further processing is required for determining a suitable number. In addition, it may simplify the resource planning and resource allocation and even the definition of a database storing the compressed data, if the amount of data that is to be stored is always the same for each grid. In another example embodiment, however, the number of frequency components may be adaptively selected. This may take account of the fact that the spatial correlation of the magnetic flux density data is not the same for each area and/or at each altitude and/or at each time. As a result, decorrelation by means of a frequency transform will not work equally well in each case, i.e. the compression quality will vary with a fixed number of frequency components. By using an adaptive number of frequency components, it may be possible to achieve a basically constant quality, which may help in achieving reliable position estimates based on reconstructed magnetic flux density data.

In an example embodiment, the number of frequency components is adaptively selected for a respective area in response to a variability of magnetic flux density data in the area.

In another example embodiment, the number of frequency components is adaptively selected based on an analysis of the deviation (or discrepancy) between the obtained magnetic flux density data and magnetic flux density data recovered from a subset of frequency components, for instance in the form of an error distribution value. This may have the effect that the best compromise between compression ratio and quality may be obtained for each grid.

The provided compressed magnetic flux density data may comprise additional data that is either obtained as a part of or along with the obtained magnetic flux density data and/or determined based on the obtained magnetic flux density data.

In an example embodiment, the provided compressed magnetic flux density data comprises in addition an indication of a size of at least one grid. This may enable a recovery of the magnetic flux density data by applying an inverse frequency transform. It is to be understood that alternatively, the size of grids, or for selected dimensions of the grids, could be set to a fixed value. Using a variable size may have the effect that grids can be adapted to a respective situation, though, for instance to the area of a respective building covered by a grid. The at least one grid, for which an indication of the size is included in the provided data, may be the same as a grid for which data is obtained, or it may be another grid that is generated based on such a grid. For example, a size of an original grid may be reduced, in case there is very little data associated with grid points along one or more edges. For example, a grid for which magnetic flux density data is obtained may be expanded by a further dimension. In this case, the size with respect to this dimension may equally be determined and included in the compressed magnetic flux density data.

In an example embodiment, the provided compressed magnetic flux density data comprises in addition an indication of a location of at least one grid. The location may be a geographical location corresponding to a predetermined edge of the grid or to the center of the grid. The location can have the effect that it allows mapping recovered magnetic flux data that are associated with particular grid points to geographic locations so that they may be used for positioning a device. The at least one grid, for which an indication of the location is included in the provided data, may be the same as a grid for which data is obtained, or it may be another grid that is generated based on such a grid. For example, if the grid for which data is obtained is resized in the scope of the processing, also the indication of the location may have to be adapted.

In an example embodiment, the provided compressed magnetic flux density data comprises in addition an indication of a point in time or an indication of a time period. This may have the effect that it may be determined whether the compressed magnetic flux density data is still considered to be sufficiently up-to-date. An indication of a period in time could indicate for example the period during which the obtained magnetic flux density data were measured. An indication of a point in time could indicate for example the time of the first or the last measurement that resulted in the obtained magnetic flux density data.

In an example embodiment of the second aspect, a magnetic flux density data measured by the mobile device that is to be positioning is obtained. A position of the mobile device may then be determined based on the magnetic flux density data measured by the mobile device and the recovered magnetic flux density data and their association with different grid points.

Figure 5:
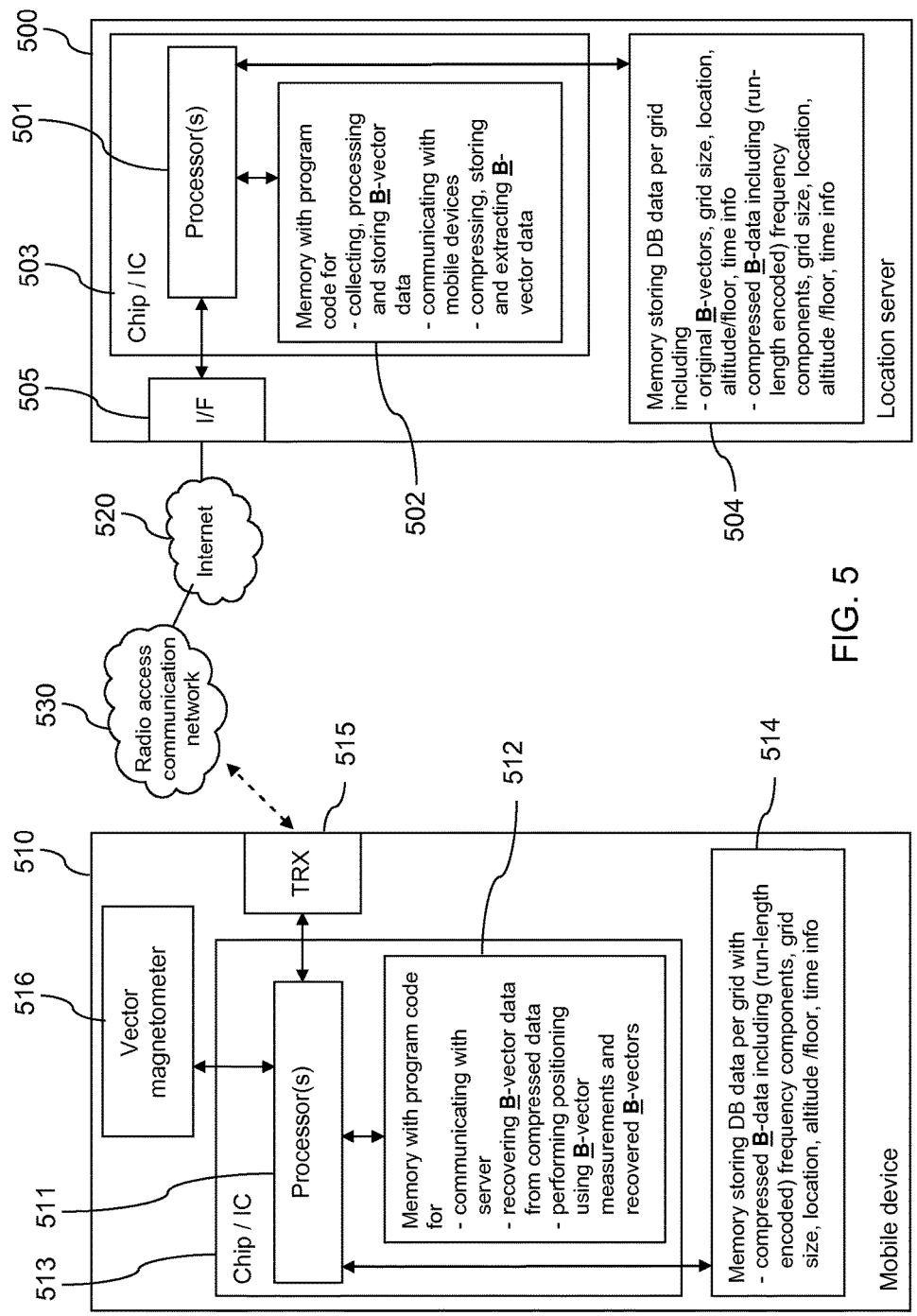
FIG. 5 is a schematic block diagram of an example embodiment of a system.

FIG. 5 is a schematic block diagram of an example embodiment of a system according to the invention. The system may support magnetic flux density based positioning of mobile devices.

The system comprises a location server 500 and a mobile device 510. The system further comprises a network 520, by way of example the Internet. The system further comprises a radio access communication network 530 that is connected to the Internet 520. The radio access communication network 530 could be for example a mobile communication network or a WLAN.

Server 500 may be for instance a dedicated location server, but it could equally be some other kind of server including corresponding positioning support functionality. Server 500 comprises a processor 501 that is linked to a first memory 502, to a second memory 504 and to an interface (I/F) 505. Processor 501 is configured to execute computer program code, including computer program code stored in memory 502, in order to cause server 510 to perform desired actions.

Memory 502 stores computer program code for communicating with mobile devices, computer program code for compressing stored B-vector data and for storing the compressed data, and computer program code for extracting the compressed data. It may comprise similar program code as memory 102. In addition, memory 502 could store computer program code configured to realize other functions, for example computer program code for collecting, processing and storing fingerprints with B-vector data, or computer program code for performing magnetic flux density based positioning computations for mobile devices. In addition, memory 502 could also store other kind of data.

Processor 501 and memory 502 may optionally belong to a chip or an integrated circuit 503, which may comprise in addition various other components, for instance a further processor or memory.

Memory 504 stores data for at least one database. A first database could be configured to store for each of a plurality of grids original B-vector data associated with grid points, and general parameters of the grid, like an indication of a grid size, an indication of a grid location, an indication of an altitude or floor number for which the grid is provided, and some time information. A second database could be configured to store for each of a plurality of grids compressed B-data, including frequency components and general parameters of the grid, like a grid size, a grid location, an altitude or floor number for which the grid is provided and a time indication. The frequency components may optionally be included in run-length encoded form. In the case of both databases, each of the grids could represent a respective area on earth.

It is to be understood that the data of memory 504 could also be distributed to several memories, which may be located partly or completely external to server 500. For example, the data of the first database could be stored at an external memory that is accessible via another server which is configured to collect and store fingerprint data including B-vector data.

Interface 505 is a component which enables server 500 to communicate with other devices, like mobile device 510, via networks 520, 530. It could also enable server 500 to communicate with entities (not shown) providing collected B-vectors or other data. Interface 505 could comprise for instance a TCP/IP socket.

Component 503 or server 500 could be an example embodiment of an apparatus according to first aspect of the invention.

Mobile device 510 may be for instance a mobile telephone, like a smartphone, a tablet PC, a laptop or any other mobile device with communication capabilities, including any kind of mobile terminal. It comprises a processor 511 that is linked to a first memory 512, to a second memory 514, to at least one transceiver 515, and to a magnetometer 516. Processor 511 is configured to execute computer program code, including computer program code stored in memory 512, in order to cause mobile device 510 to perform desired actions.

Memory 512 stores computer program code for communicating with location server 500, for recovering B-vector data, and for determining a position of mobile device 500 using a magnetic flux density based positioning. The computer program code may comprise for example similar program code as memory 302. In addition, memory 512 could store computer program code configured to realize other functions as well as any other kind of data.

Processor 511 and memory 512 may optionally belong to a chip or an integrated circuit 513, which may comprise in addition various other components, for instance a further processor or memory.

Memory 514 stores data of a database. The database is configured to store for each of a plurality of grids, representing a respective area on earth, compressed B-data, including frequency components and general parameters of the grid, like a grid size, a grid location, an altitude or floor number for which the grid is provided and a time indication. The frequency components may optionally be included in run-length encoded form.

Transceiver 515 is a component which enables mobile device 510 to communicate with other devices, like server 500, via at least one kind of radio communication node, for instance a base station of a mobile communication network or a wireless local area (WLAN) access point.

Magnetometer 516 is a vector magnetometer that may be configured to measure the three elements bx, by, bz of a magnetic flux density vector at the respective location of mobile device 510.

Component 513 or mobile device 510 may be an example embodiment of an apparatus according to the second aspect of the invention.

Example operations in the system of FIG. 5 will now be described with reference to FIGS. 6 and 7.

Figure 6:
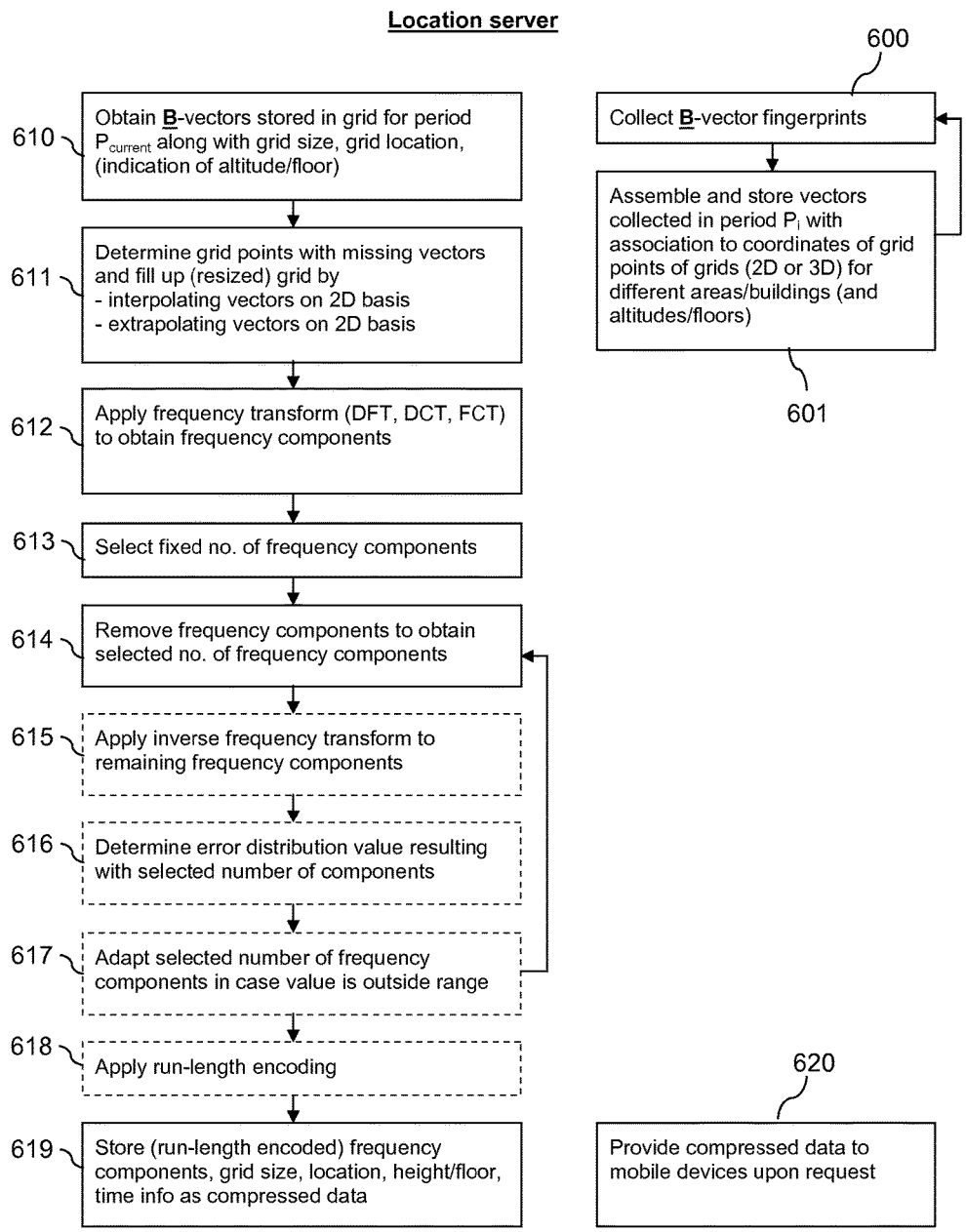
FIG. 6 is a flow chart illustrating a first example embodiment of an operation in the system of FIG. 5.

FIG. 6 is a flow chart illustrating example operations according to the first aspect. These operations may be performed for example by location server 500.

Processor 501 and some of the program code stored in memory 502 may cause location server 500 to perform the presented actions when the program code is retrieved from memory 502 and executed by processor 501.

Some mobile devices, which comprise a magnetometer, may perform measurements on the magnetic flux density on a regular basis. In addition, they may determine their location at the time of a respective measurement. The indication of the location may comprise a latitude value, a longitude value and—optionally—an altitude value or a floor number of a building. The location may be determined for example based on satellite signal measurements of an equally available GNSS receiver. Alternatively, the location could be determined for example based on an input by a user. Further alternatively, the location could be determined for example by means of a non-cellular network based positioning using signals from WLAN access points. When permitted by the user of a respective mobile device, the mobile device provides a B-vector corresponding to the measurement results of a respective measurement to location server 500 along with an indication of the determined location of measurement and an indication of the time of measurement as a fingerprint. B-vectors could also be collected at a mobile device for collective transmission to location server 500.

Location server 500 may continuously collect such fingerprints from a plurality of mobile devices. (action 600)

Location server 500 may associate the B-vectors from the collected fingerprints to a respective grid point of a grid making use of the indicated location. (action 601) This action may be based for example on all fingerprints that include an indication of a time of measurement falling within a predetermined period of time. The action may be repeated in regular intervals based on newly collected data.

The grid may be a two-dimensional grid or a three-dimensional grid. The grid may be a discrete coordinate grid, and each grid point can be defined by a set of coordinates, for instance x- and y-coordinates in the case of a two-dimensional grid and x-, y- and z-coordinates in the case of a three-dimensional grid. The grid points can but do not have to have a predetermined uniform spacing in all dimensions or in a respective dimension. Furthermore, at this stage the grid may or may not be rectangular in the case of a two-dimensional grid, and it may or may not be cuboid-formed in the case of a three-dimensional grid. A two-dimensional grid may be associated in addition on a general basis with a particular altitude value or a particular floor number. Each grid point represents a particular geographical location. Each grid may be associated with a period of time during which the vectors in the considered fingerprints have been measured. The grid may be one of a plurality of grids. Different grids may be defined for different geographical areas, for example the areas of different buildings. In case grids are only defined for selected areas, for instance only such areas that are relevant for indoor positioning, fingerprints may only be considered if the location indicated in the fingerprint lies in a geographical area with matching grid.

The location indicated in a fingerprint is likely not to be exactly a geographical location that is associated with one of the grid points of a grid. Therefore, server 500 may map each B-vector that is to be considered further to a grid point that is associated with a geographical location that is closest to the indicated location of measurement. In some embodiments, ultimately only a single B-vector may be associated with a grid point. If several received vectors are mapped to a particular grid point, the mean or median value of each vector element across the vectors may be determined and the resulting new B-vector may be associated with the particular grid point.

Location server 500 stores the results of the mapping in memory 504. The stored data comprises for each grid the B-vectors that have ultimately been associated with a respective grid point, an indication of the size of the grid, an indication of the location of the grid, in the case of a two-dimensional grid an indication of the altitude or floor for which the grid is provided and an indication of the period of time $P_i$, during which the vectors have been measured. Any desired further information may be included, like a spacing of the grid points, if this is not fixed.

Location server 500 computes in addition a compressed version of the data that is assembled and stored in action 601. While the data stored in action 601 constitutes processed collected data, it is also referred to as original B-vector data in the sense that it constitutes data before compression.

For the compression, location server 500 obtains the stored B-vectors that are associated with a respective grid and that are available for the most recent period $P_{current}$, as well as other data stored for this grid. (action 610) It is to be understood that the same operations may be performed for all grids with associated vectors stored in memory 504.

The obtained data may not comprise vectors for all grid points of the grid, since for some grid points no fingerprints have been received. Furthermore, some vectors received in fingerprints may be discarded as outliers before the original vector data is stored in memory 504 in action 601 or after it has been retrieved from memory 504 in action 610. An outlier may be defined for instance to be any vector of which any element exceeds a predetermined distance to the center of gravity of the corresponding element of all vectors associated with grid points of the grid.

In order to compress the grid data by means of a frequency transform, as described further below, the grid should be fully occupied, though. In addition, it should be rectangular in the case of a two-dimensional grid or of cuboid form in the case of a three-dimensional grid. Therefore, the grid may be resized so that vectors are available for most grid points of a rectangular or cuboid-formed grid. In this case, the size information and the location information stored for the original data have to be updated. Then, additional vectors may be created and associated with all remaining grid points, with which no vector is associated. (action 611)

Location server 500 may create additional vectors by linear interpolation, as far as possible based on the available vectors. Linear interpolation may result in high quality vectors. The actual interpolation may be preceded by a two-dimensional Delaunay triangulation step serving for establishing a suitable basis for interpolation. Each interpolated vector is subsequently associated with the respective grid point for which it has been created.

Linear interpolation may not be possible if there are not sufficient grid points with associated vectors nearby. This may often be the case with grid points located at the edges of the grid. For the remaining grid points without associated vector, a vector is therefore created by means of linear extrapolation. A gradient based linear extrapolation approach may be simple to implement and yet be efficient. Each extrapolated vector is subsequently associated with the respective grid point for which it has been created.

It has to be noted that also in the case of a three-dimensional grid, the interpolation and extrapolation may be performed separately for each horizontal layer of grid points, since in indoor 3D scenarios, the magnetic flux density vectors may differ significantly in vertical direction.

Location server 500 may then apply a frequency transform to the completed set of vectors and their association with a respective grid point. (action 612) By way of example, the discrete frequency transform is assumed to be a DCT. It could also be a DFT, an FCT or any other desired discrete frequency transform.

Since each of the B-vectors comprises three elements $b_x$, $b_y$, $b_z$, each element being associated with the vector to a particular grid point, a first transform could be applied to the set of first elements $b_x$ of the vectors, a second transform could be applied to the set of second elements $b_y$ of the vectors and a third transform could be applied to the set of third elements $b_z$ of the vectors. This may have the effect that the complexity of computations is simplified, and it may take account of the fact that the values of elements $b_x$, $b_y$, $b_z$ may be less correlated among each other than the values of element $b_x$ of all vectors, the values of element $b_y$ of all vectors and the values of element $b_z$ of all vectors considered separately. Alternatively however, the existence of three elements per vector could be considered to add one dimension to the grid. For example, a two-dimensional grid, with grid points defined by x- and y-coordinates and representing a particular geographical location defined by a pair of longitude and latitude, could be expanded to a three-dimensional grid with grid points defined by x-, y- and b-coordinates. A respective vector element by itself could then be associated with each grid point of the expanded grid. For example, if a vector is associated with the first grid point ($x_0$, $y_0$) of a two-dimensional grid, the first vector element $b_x$ of this vector could be considered to be associated with grid point ($x_0$, $y_0$, $b_x$) of the expanded grid. The same applies to an originally three-dimensional grid, with each grid point representing a particular geographical location including the altitude, which may be expanded to a four-dimensional grid.

Due to these possible alternatives of using two-dimensional, three-dimensional or four-dimensional grids as a basis for a frequency transform, the following description of an exemplary embodiment of a DCT is provided on a general basis for an N-dimensional input image. An N-dimensional input image is assumed to comprise one value associated with each grid point of an N-dimensional grid. The approach would also allow considering more dimensions for further parameters, for instance for time.

An N-dimensional input image may be defined as $r(n_0, n_1, \ldots, n_{N-1})$, where $n_i$ (with $n_j=[1, N_j]$) refers to the discrete coordinates of the grid points. The N-dimensional DCT $R(k_0, k_1, \ldots, k_{N-1})=R(k)$, wherein $k=[k_0, \ldots k_{N-1}]$ is an index vector with $k_j=[1, N_j]$ which points to an element of an N-dimensional matrix, may be calculated based on the following equation:

$$R(k_0, k_1, \ldots, k_{N-1}) = \omega(k_0) \ldots \omega(k_{N-1}) \sum_{n_0=1}^{N_0} \ldots$$

$$\sum_{n_{N-1}=1}^{N_{N-1}} [r(n_0, n_1, \ldots, n_{N-1}) \Phi(n_0, k_0, N_0) \ldots \Phi(n_{N-1}, k_{N-1}, N_{N-1})]$$

Therein, $$\Phi(n_i, k_i, N_i) = \cos\left[\frac{\pi(2n_i - 1)(k_i - 1)}{2N_i}\right]$$

and, with $N_j$ being the size of the $j^{th}$ dimension of the input image, $$\omega(k_j) = \begin{cases} \frac{1}{\sqrt{N_j}}, & \text{if } k_j = 1 \\ \sqrt{\frac{2}{N_j}}, & \text{otherwise} \end{cases}$$

The resulting value of each element of the N-dimensional matrix constitutes a frequency component.

Only a limited number of the frequency components $R(k_0, k_1, \ldots, k_{N-1})$ obtained in action 612 is maintained, in order to achieve a compression effect. The less frequency components are maintained, the higher is the achieved data compression rate.

The number M of frequency components that is to be maintained may be fixed or be selected in an adaptive manner. In any case, it may be set to a fixed value at first. (action 613)

Next, those M frequency components may be selected, which have the highest values. The other frequency components are discarded to obtain the selected number of remaining frequency components. (action 614) Frequency components may be discarded by setting their value to zero in the matrix.

If an adaptive selection of the number of frequency components is to be used, this may be realized using an iterative approach, which is illustrated in FIG. 6 with actions 615 to 617.

In the iteration, at first an inverse frequency transform is applied to the remaining frequency components, in order to recover the N-dimensional image. (action 615) A possible embodiment of such an inverse frequency transform will be described in more detail further below.

Next, an error distribution value is determined by comparing the original N-dimensional image as used in action 612 with the recovered N-dimensional image. (action 616) The error distribution value may be determined by subtracting the recovered N-dimensional image from the original N-dimensional image, and by determining the standard deviation of the difference. The standard deviation may then serve as an indication of the error between the B-vectors obtained in action 611 and the B-vectors that may be recovered from the currently selected subset of frequency components.

The error deviation value may be required to lie within a predetermined range. An upper limit ensures the quality of the compressed data. A lower limit ensures that the amount of data that has to be stored is not higher than required for a satisfactory compression quality. In case the error deviation value is determined to lie outside of the allowed range, the selected number of frequency components is adjusted. (action 617). That is, if the error deviation value exceeds a maximum value, the selected number of frequency components is increased and if the error deviation value falls short of a minimum value, the selected number of frequency components is reduced. It may be noted that as an additional criterion, it may be ensured that the selected number of frequency components does not exceed a predetermined maximum number, even if the desired maximum error distribution value cannot be achieved.

The process may then continue with action 614, until an error within the predetermined range is obtained (or a predetermined maximum number is reached).

Once the error distribution value is satisfactory (or a predetermined maximum number of frequency components is reached), optionally, a run-length encoding may be applied to the remaining frequency components. (action 618) Thereby, an additional compression may be achieved. In contrast to the approach of compressing the original data by applying a discrete frequency transform thereto and maintaining only a reduced number of frequency components, run-length encoding is a lossless compression method. Since only a reduced number of frequency components has been maintained in action 614 by setting the value of the other frequency components to zero in the frequency component matrix, the matrix may comprise a large number of elements having a value of zero. A run-length encoding may be selected and applied, which is defined specifically for collapsing sequences of zeros. In this case, the run-length encoding is particularly well suited for the compression of a limited number of frequency components.

Location server 500 may store the—optionally run-length encoded—frequency components together with an indication of the grid size, the grid location, the altitude or floor for which the grid is provided in the case of (spatially) two-dimensional grids as well as time information in memory 504 as compressed B-data. (action 619) It is to be understood that some of the supplementary information that is not compressed as such could also be stored in common for the original B-vectors and the compressed data in memory 504. It has to be noted, though, that the grid size may be different for the original data and the compressed data, since the grid size may be changed in action 611. As a result, also the location information may change. For example, if the location information indicates a geographical location represented by the grid point at the upper left corner of an original two-dimensional grid and the grid is resized in action 611, the grid point at the upper left corner of the resized grid may correspond to another geographical location, which may be computed from the original geographical location, information on the resizing and information on the grid spacing. Optionally, an indication of the final error distribution value determined in action 616 may be stored in addition along with the compressed data for a respective grid. The indicator of the error distribution value may be suited to provide information on the quality of the stored frequency components and thus also on the quality of any reconstructed B-vectors that may be obtained therefrom. The indicator may therefore be used in estimating the uncertainty of a position estimate obtained based on reconstructed B-vectors.

Location server 500 may provide the compressed data for instance to mobile devices upon request. (action 620)

Figure 7:
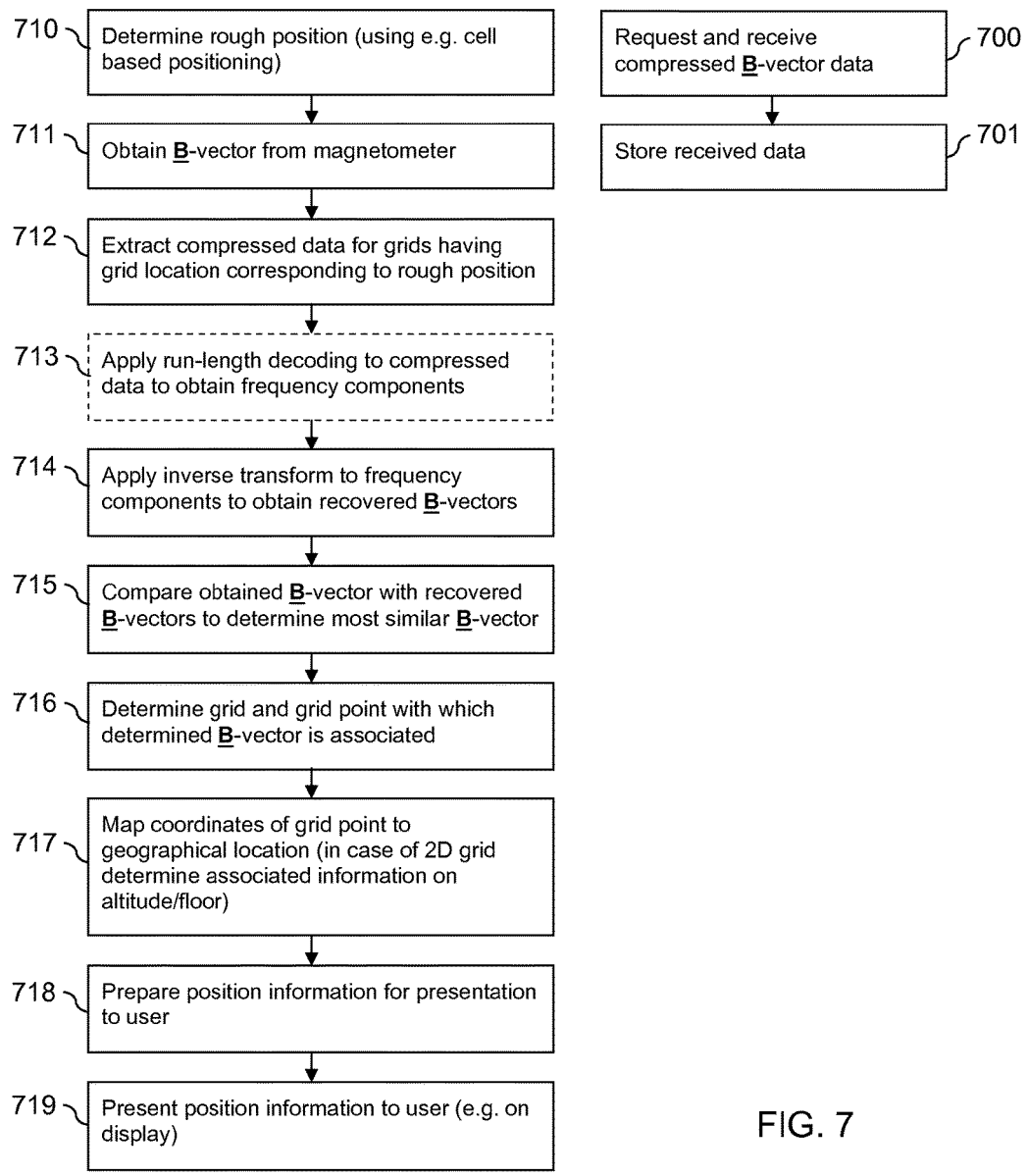
FIG. 7 is a flow chart illustrating a second example embodiment of an operation in the system of FIG. 5.

FIG. 7 is a flow chart illustrating example operations according to the second aspect. These operations may be performed for example by mobile device 510.

Processor 511 and some of the program code stored in memory 512 may cause mobile device 510 to perform the presented actions when the program code is retrieved from memory 512 and executed by processor 511.

Mobile device 510 may request and receive compressed B-data from location server 500. (action 700) Mobile device 510 may request all available data or indicate particular areas for which the data is desired. In the latter case, the received data may be limited to data for these indicated areas. An area could also be indicated by identifying a particular building. Data for a plurality of areas could also be requested in a comprehensive manner by requesting available data for any area in an indicated region or country. The received data may be stored in memory 514 for later or immediate use. (action 701) The received data comprises for each area data that relates to at least one grid. Data relating to a plurality of grids may be provided for a one area for example, if separate two-dimensional grids are used for different altitudes of an area or different floors of a building. The data may comprise for each area frequency components, an indication of a grid size, an indication of a location, an indication of an altitude or floor and time information. The frequency components may optionally be in run-length encoded form.

A user of mobile device 510 or an application running in mobile device 510 or an external application communicating with mobile device 510 may now request to be provided with information on a fairly exact position of mobile device 510. Mobile device 510 may not comprise a GNSS receiver for determining an exact position, or mobile device 510 may currently be located indoors so that a GNSS based positioning may not be possible.

Mobile device 510 may determine at first a rough position as a basis. (action 710) Such a rough position could be obtained for instance using a cell based positioning or a WLAN based positioning. In some embodiments, the location of a currently serving cell of a cellular communication network or the location of a detected WLAN access point can be used as rough position. Alternatively, in case mobile device 510 does comprise a GNSS receiver, the last position determined by a GNSS based positioning could be used.

In addition, mobile device 510 obtains a B-vector from magnetometer 516. (action 711) The B-vector has been measured by magnetometer 516 at the current location of mobile device 510. Magnetometer 516 may measure B-vectors continuously when activated, or only upon a respective request. The obtained B-vector comprises three elements $b_x$, $b_y$, $b_z$ indicating the amplitude of the magnetic flux density in a respective one of three perpendicular directions.

Mobile device 510 extracts compressed B-vector information from memory 514. (action 712) Based on the location and size information associated with each set of compressed data in memory 514, mobile device 510 may extract only the data that is related to grids lying within the surroundings of the rough location information determined in action 710.

If the frequency components in the extracted sets of data are run-length encoded, mobile device 510 applies a run-length decoding to the frequency components in each extracted set of data. (action 713) The result is recovered frequency components for each set.

Next, mobile device 510 may apply an inverse DCT to the frequency components to obtain recovered B-vectors separately for each set of data. (action 714)

For the inverse DCT, a zero valued frequency component matrix is initialized. The dimensions of the matrix are selected to be $N_0$, $N_1$, ..., $N_{N-1}$. The size of this matrix is derived from information on the grid size, which may be stored together with the compressed data in memory 514. The thus obtained matrix may be written as $R_{recov}(k)=0$.

Next, the values of the non-zero frequency components may be inserted at appropriate positions in the matrix. With the dimensions of the matrix being $N_0$, $N_1$, ..., $N_{N-1}$, and $R(k_j)$ and $k_j$ being the maintained frequency components and their indices for $j=0 \ldots N_{components}-1$, this step may be described as setting $R_{recov}(k_j)$ to $R(k_j)$. The reconstructed B-vectors may now be obtained by applying an IDCT to the matrix.

The reconstructed N-dimensional image $r(n_0, n_1, \ldots, n_{N-1})$ may be calculated according to the following equation:

$$r(n_0, n_1, \ldots, n_{N-1}) = \sum_{k_0=1}^{N_0} \ldots \sum_{k_{N-1}=1}^{N_{N-1}} [\omega(k_0) \ldots \omega(k_{N-1}) R_{recov}(k_0, k_1, \ldots, k_{N-1})$$

$$\Phi(n_0, k_0, N_0) \ldots \Phi(n_{N-1}, k_{N-1}, N_{N-1})]$$

Therein, $$\Phi(n_i, k_i, N_i) = \cos\left[\frac{\pi(2k_i - 1)(n_i - 1)}{2N_i}\right]$$

and $$\omega(k_j) = \begin{cases} \dfrac{1}{\sqrt{N_j}}, & \text{if } k_j = 1 \\ \sqrt{\dfrac{2}{N_j}}, & \text{otherwise} \end{cases}.$$

Recovered B-vectors may now be assembled by combining the thus recovered vector elements. For example, if a grid expanded by one dimension was used for compression and reconstruction, the values associated with three grid points that represent the same geographical location in the N-dimensional image constitute the three elements of a recovered B-vector that is associated with a grid point representing this geographical location in a grid that is reduced again by one dimension.

Mobile device 510 may now compare the B-vector obtained in action 710 with the recovered B-vectors of one or more grids to determine the most similar recovered B-vector. (action 715)

Based on the comparison, mobile device 510 may determine the grid and the coordinates of the grid point with which this most similar recovered B-vector is associated. (action 716)

The coordinates of the grid point may be mapped to a geographical location using the information on the geographical location stored in the associated set of data. For example, if the information on a geographical location stored for a grid represents the geographical location corresponding to a corner of the grid, and the geographical distance between the grid points in each dimension are known, the geographical location can be easily determined based on the coordinates of a grid point determined in action 716. In case the grid is one of a plurality of two-dimensional grids for the same area, an indication of an altitude or floor number that is stored for the selected grid may be determined in addition from the associated set of data. (action 717)

Based on the determined information, mobile device 510 may generate position information for presentation to a user. (action 718) The generated position information could be for instance in the form of longitude and latitude values plus an indication of the altitude or floor; or it could be in the form of a map with a marking of the position and optionally a label indicating the altitude or the floor number. If the user is located in a building and a floor plan for each floor of the building is available, a floor plan of the appropriate floor with an indication of the position on the floor plan could be prepared for presentation.

The position information may be presented to a user for instance on a display. (action 719) It is to be understood, however, that corresponding information could also be presented for instance in the form of an audible output.

Alternatively to a presentation to a user, the determined position information could be provided to some application for further use.

It is to be understood that the presented example system as well as the presented example operations may be varied in many ways. The operations may be varied for instance by modifying actions, by omitting actions and/or by adding actions. In addition, the order of actions could be modified.

In an alternative embodiment, to provide just one example, actions 600 and 601 could be performed for instance by some other server than location server 500. In this case, location server 500 might optionally never store the original and uncompressed B-vector data permanently, but only obtain and buffer a version from the other server upon request or at regular intervals in order to be able to generate and store a compressed version. If location server 500 is configured to carry out positioning computations for mobile devices, it might then use the compressed data as a basis for performing similar actions as action as 711 to 718 presented with reference to FIG. 7.

Summarized, certain embodiments of the invention may have the effect that the use of data on magnetic flux density for positioning purposes may be facilitated. In some embodiments, positioning using data on magnetic flux density and in particular an offline positioning using data on magnetic flux density may be enabled in the first place.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 8:
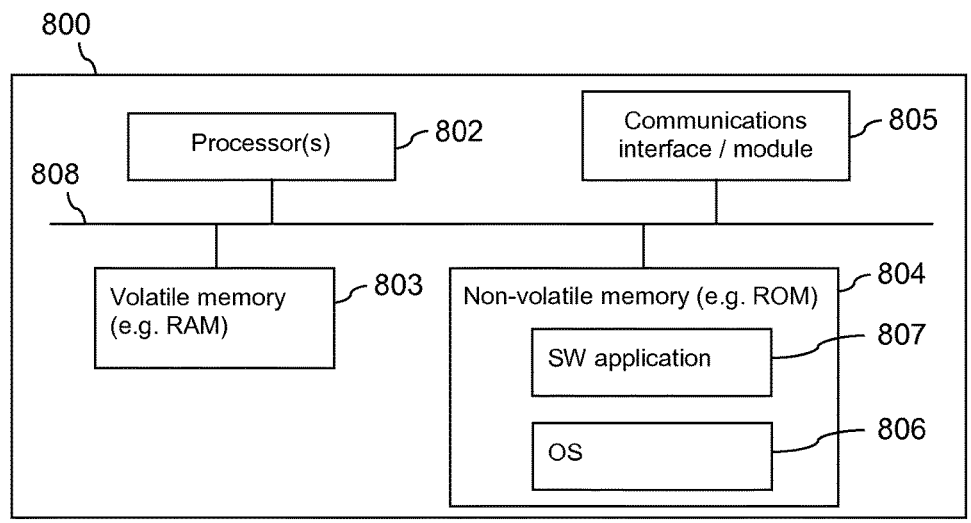
FIG. 8 is a schematic block diagram of an example embodiment of an apparatus.
Figure 9:
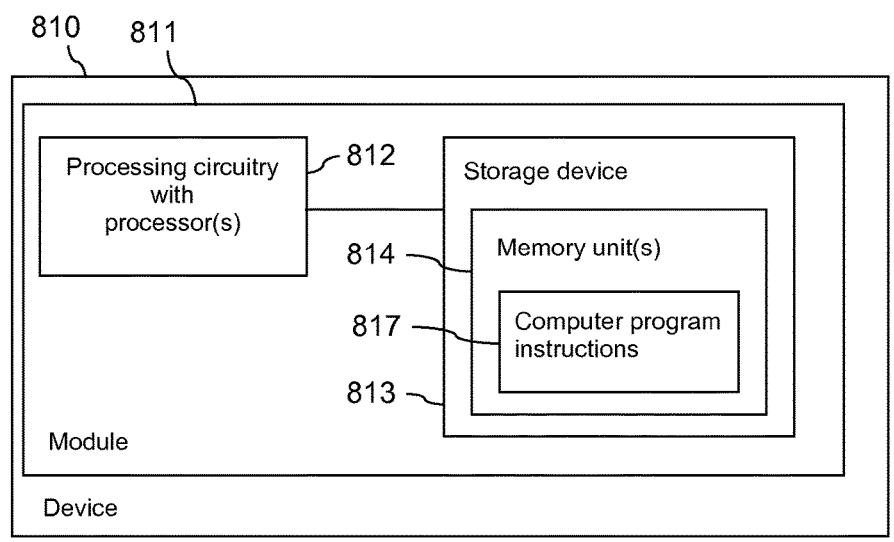
FIG. 9 is a schematic block diagram of an example embodiment of an apparatus.

Example embodiments using at least one processor and at least one memory as a non-transitory data medium are shown in FIGS. 8 and 9.

FIG. 8 is a schematic block diagram of a device 800. Device 800 includes a processor 802. Processor 802 is connected to a volatile memory 803, such as a RAM, by a bus 808. Bus 808 also connects processor 802 and RAM 803 to a non-volatile memory 804, such as a ROM. A communications interface or module 805 is coupled to bus 808, and thus also to processor 802 and memories 803, 804. Within ROM 804 is stored a software (SW) application 807. Software application 807 may be a positioning application, although it may take some other form as well. An operating system (OS) 806 also is stored in ROM 804.

FIG. 9 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions 817 that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions 817 that, when loaded into processing circuitry 812, control the operation of module 811.

The software application 807 of FIG. 8 and the computer program instructions 817 of FIG. 9, respectively, may correspond e.g. to the computer program code in any of memories 102, 302, 502 or 512, respectively.

Figure 10:
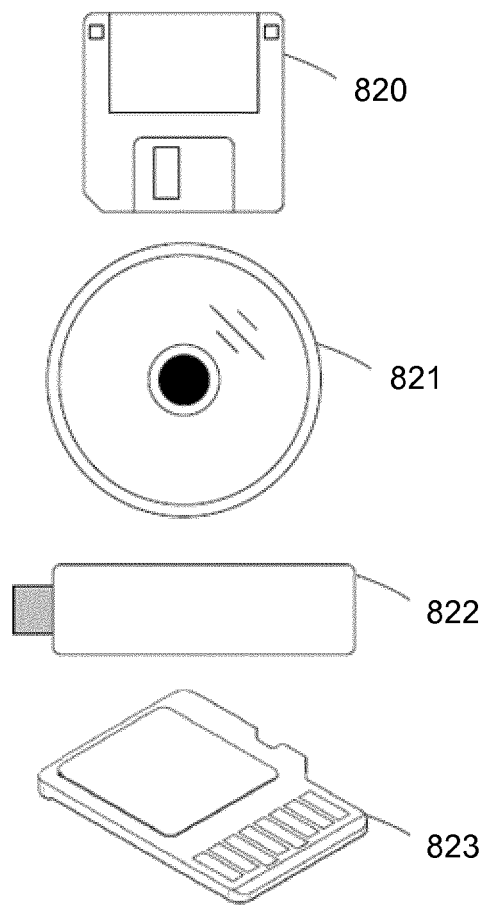
FIG. 10 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 10, which presents, from top to bottom, schematic diagrams of a magnetic disc storage 820, of an optical disc storage 821, of a semiconductor memory circuit device storage 822 and of a Micro-SD semiconductor memory card storage 823.

The functions illustrated by processor 101 in combination with memory 102, or processor 501 in combination with memory 502, or the integrated circuit 503 can also be viewed as means for obtaining data comprising magnetic flux density data and an association of the magnetic flux density data to grid points of at least one grid, each grid point representing at least a geographical location; means for applying at least one frequency transform to a representation of the magnetic flux density data and their association to grid points to obtain frequency components; and means for providing compressed magnetic flux density data comprising a subset of the obtained frequency components for at least one of storage and transmission.

The program codes in memories 102 and 502 can also be viewed as comprising such means in the form of functional modules.

The functions illustrated by processor 301 in combination with memory 302, or processor 511 in combination with memory 512, or the integrated circuit 513 can also be viewed as means for obtaining frequency components representing magnetic flux density data and an association of the magnetic flux density data with different grid points of at least one grid in compressed form, each grid point representing at least a geographical location; means for applying at least one inverse frequency transform to the frequency components in order to recover the magnetic flux density data and their association with different grid points; and means for providing the recovered magnetic flux density data and their association with different grid points for supporting a positioning of a mobile device.

The program codes in memories 302 and 512 can also be viewed as comprising such means in the form of functional modules.

FIGS. 2, 4, 6 and 7 may also be understood to represent example functional blocks of computer program codes supporting a magnetic flux density based positioning.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:

1. A method, performed by at least one apparatus comprising:
obtaining data comprising magnetic flux density data and an association of the magnetic flux density data to grid points of at least one grid, each grid point representing at least a geographical location, wherein the magnetic flux data comprises a representation of magnetic flux density vectors, and wherein at least some representations of a magnetic flux density vector are associated with one of:
a grid point of a grid representing one of a plurality of geographical areas; or
a grid point of a grid representing the area of a particular building; or
coordinates of a grid point of a two-dimensional grid; or
coordinates of a grid point of one of a plurality of two-dimensional grids, each grid being provided for a different floor number; or
coordinates of a grid point of one of a plurality of two-dimensional grids, each grid being provided for a different altitude; or
coordinates of a grid point of a three-dimensional grid;
applying at least one frequency transform to a representation of the magnetic flux density data and their association to grid points to obtain frequency components; and
providing compressed magnetic flux density data comprising a subset of the obtained frequency components for at least one of storage and transmission.

2. The method according to claim 1, the method further comprising before applying the at least one frequency transform:
determining grid points of the at least one grid for which no magnetic flux density data is obtained; and
computing magnetic flux density data for determined grid points by one of interpolating and extrapolating available magnetic flux density data in order to obtain magnetic flux density data for each grid point.

3. The method according to claim 1, wherein applying a frequency transform to a representation of the magnetic flux density data and their association to grid points into frequency components comprises applying one of the following:
a Discrete Fourier Transform; or
a Discrete Cosine Transform; or
a Fast Cosine Transform.

4. The method according to claim 1, wherein the number of frequency components of the subset of frequency components is one of:
fixed; or
adaptively selected; or
adaptively selected based on an analysis of a deviation between the obtained magnetic flux density data and magnetic flux density data recovered from the subset of frequency components; or
adaptively selected for a respective geographical area in response to a variability of the magnetic flux density data in the geographical area.

5. The method according to claim 1, wherein the provided compressed magnetic flux density data comprises in addition at least one:
an indication of a size of at least one grid; and/or
an indication of a location of at least one grid; and/or
an indication of a point in time; and/or
an indication of a time period.

6. An apparatus comprising at least one processor and at least one memory including computer program code, the at least one memory and the computer program code configured to, with the at least one processor, cause the apparatus at least to perform:
obtain data comprising magnetic flux density data and an association of the magnetic flux density data to grid points of at least one grid, each grid point representing at least a geographical location, wherein the magnetic flux data comprises a representation of magnetic flux density vectors, and wherein at least some representations of a magnetic flux density vector are associated with one of:
- a grid point of a grid representing one of a plurality of geographical areas; or
- a grid point of a grid representing the area of a particular building; or
- coordinates of a grid point of a two-dimensional grid; or
- coordinates of a grid point of one of a plurality of two-dimensional grids, each grid being provided for a different floor number; or
- coordinates of a grid point of one of a plurality of two-dimensional grids, each grid being provided for a different altitude; or
- coordinates of a grid point of a three-dimensional grid;

apply at least one frequency transform to a representation of the magnetic flux density data and their association to grid points to obtain frequency components; and provide compressed magnetic flux density data comprising a subset of the obtained frequency components for at least one of storage and transmission.

7. The apparatus according to claim 6, wherein the at least one memory and the computer program code are configured to, with the at least one processor, cause the apparatus to perform the following before applying the at least one frequency transform:
- determine grid points of the at least one grid for which no magnetic flux density data is obtained; and
- compute magnetic flux density data for determined grid points by one of interpolating and extrapolating available magnetic flux density data in order to obtain magnetic flux density data for each grid point.

8. The apparatus according to claim 6, wherein applying a frequency transform to a representation of the magnetic flux density data and their association to grid points into frequency components comprises applying one of the following:
- a Discrete Fourier Transform; or
- a Discrete Cosine Transform; or
- a Fast Cosine Transform.

9. The apparatus according to claim 6, wherein the number of frequency components of the subset of frequency components is one of:
- fixed; or
- adaptively selected; or
- adaptively selected based on an analysis of a deviation between the obtained magnetic flux density vectors and magnetic flux density vectors recovered from the subset of frequency components; or
- adaptively selected for a respective area in response to a variability of a magnetic flux density vectors in the area.

10. The apparatus according to claim 6, wherein the provided compressed magnetic flux density data comprises in addition at least one:
- an indication of a size of at least one grid; and/or
- an indication of a location of at least one grid; and/or
- an indication of a point in time; and/or
- an indication of a time period.

11. The apparatus according to claim 6, wherein the apparatus is one of:
- a chip; or
- a module for a server; or
- a server; or
- a module for a mobile device; or
- a mobile device.

12. A computer readable storage medium in which computer program code is stored, the computer program code causing an apparatus to perform the following when executed by a processor:
obtain data comprising magnetic flux density data and an association of the magnetic flux density data to grid points of at least one grid, each grid point representing at least a geographical location, wherein the magnetic flux data comprises a representation of magnetic flux density vectors, and wherein at least some representations of a magnetic flux density vector are associated with one of:
- a grid point of a grid representing one of a plurality of geographical areas; or
- a grid point of a grid representing the area of a particular building; or
- coordinates of a grid point of a two-dimensional grid; or
- coordinates of a grid point of one of a plurality of two-dimensional grids, each grid being provided for a different floor number; or
- coordinates of a grid point of one of a plurality of two-dimensional grids, each grid being provided for a different altitude; or
- coordinates of a grid point of a three-dimensional grid;

apply at least one frequency transform to a representation of the magnetic flux density data and their association to grid points to obtain frequency components; and provide compressed magnetic flux density data comprising a subset of the obtained frequency components for at least one of storage and transmission.

13. A method performed by at least one apparatus, the method comprising:
obtaining frequency components representing magnetic flux density data and an association of the magnetic flux density data with different grid points of at least one grid in compressed form, each grid point representing at least a geographical location, wherein the magnetic flux data comprises a representation of magnetic flux density vectors, and wherein at least some representations of a magnetic flux density vector are associated with one of:
- a grid point of a grid representing one of a plurality of geographical areas; or
- a grid point of a grid representing the area of a particular building; or
- coordinates of a grid point of a two-dimensional grid; or
- coordinates of a grid point of one of a plurality of two-dimensional grids, each grid being provided for a different floor number; or
- coordinates of a grid point of one of a plurality of two-dimensional grids, each grid being provided for a different altitude; or
- coordinates of a grid point of a three-dimensional grid;

applying at least one inverse frequency transform to the frequency components in order to recover the magnetic flux density data and their association with different grid points; and providing the recovered magnetic flux density data and their association with different grid points for supporting a positioning of a mobile device.

14. The method according to claim 13, further comprising obtaining a magnetic flux density data measured by the mobile device; and determining a position of the mobile device based on the magnetic flux density data measured by the mobile device and the recovered magnetic flux density data and their association with different grid points.

15. An apparatus comprising at least one processor and at least one memory including computer program code, the at least one memory and the computer program code configured to, with the at least one processor, cause the apparatus at least to perform:
  obtain frequency components representing magnetic flux density data and an association of the magnetic flux density data with different grid points of at least one grid in compressed form, each grid point representing at least a geographical location, wherein the magnetic flux data comprises a representation of magnetic flux density vectors, and wherein at least some representations of a magnetic flux density vector are associated with one of:
    a grid point of a grid representing one of a plurality of geographical areas; or
    a grid point of a grid representing the area of a particular building; or
    coordinates of a grid point of a two-dimensional grid; or
    coordinates of a grid point of one of a plurality of two-dimensional grids, each grid being provided for a different floor number; or
    coordinates of a grid point of one of a plurality of two-dimensional grids, each grid being provided for a different altitude; or
    coordinates of a grid point of a three-dimensional grid;
  apply at least one inverse frequency transform to the frequency components in order to recover the magnetic flux density data and their association with different grid points; and
  provide the recovered magnetic flux density data and their association with different grid points for supporting a positioning of a mobile device.

16. The apparatus according to claim 15, wherein the at least one memory and the computer program code are configured to, with the at least one processor, cause the apparatus to at least one of:
  obtain a magnetic flux density vector measured by the mobile device; and
  determine a position of the mobile device based on the magnetic flux density vector measured by the mobile device and the recovered magnetic flux density vectors and their association with different grid points.

17. The apparatus according to claim 15, wherein the apparatus is one of:
  a chip; or
  a module for a server; or
  a server; or
  a module for a mobile device; or
  a mobile device; pr
  a mobile device comprising a magnetometer; or
  a mobile communication device.

18. A computer readable storage medium in which computer program code is stored, the computer program code causing an apparatus to perform the following when executed by a processor:
  obtain frequency components representing magnetic flux density data and an association of the magnetic flux density data with different grid points of at least one grid in compressed form, each grid point representing at least a geographical location, wherein the magnetic flux data comprises a representation of magnetic flux density vectors, and wherein at least some representations of a magnetic flux density vector are associated with one of:
    a grid point of a grid representing one of a plurality of geographical areas; or
    a grid point of a grid representing the area of a particular building; or
    coordinates of a grid point of a two-dimensional grid; or
    coordinates of a grid point of one of a plurality of two-dimensional grids, each grid being provided for a different floor number; or
    coordinates of a grid point of one of a plurality of two-dimensional grids, each grid being provided for a different altitude; or
    coordinates of a grid point of a three-dimensional grid;
  apply at least one inverse frequency transform to the frequency components in order to recover the magnetic flux density data and their association with different grid points; and
  provide the recovered magnetic flux density data and their association with different grid points for supporting a positioning of a mobile device.

* * * * *